(12) United States Patent
Price

(10) Patent No.: US 11,612,152 B1
(45) Date of Patent: Mar. 28, 2023

(54) MULTI-MESH AND HOOK APPARATUS AND METHOD

(71) Applicant: Gilbert E. Price, Crestview, FL (US)

(72) Inventor: Gilbert E. Price, Crestview, FL (US)

(*) Notice: Subject to any disclaimer, the term of this patent is extended or adjusted under 35 U.S.C. 154(b) by 0 days.

(21) Appl. No.: 17/341,757

(22) Filed: Jun. 8, 2021

(51) Int. Cl.
*A01K 83/06* (2006.01)

(52) U.S. Cl.
CPC .................. *A01K 83/06* (2013.01)

(58) Field of Classification Search
CPC .... A01K 83/061; A01K 83/066; A01K 83/06; A01K 83/00; A01K 85/021; A01K 85/1831; A01K 85/1833; A01K 85/02
USPC ................. 43/42.41, 44.99, 44.2, 44.4, 43.2
See application file for complete search history.

(56) References Cited

U.S. PATENT DOCUMENTS

| | | | | |
|---|---|---|---|---|
| 573,572 A * | 12/1896 | Dales | ................. | A01K 83/06 43/41 |
| 2,780,021 A * | 2/1957 | Fagg | ................. | A01K 83/06 43/44.99 |
| 2,997,160 A * | 8/1961 | Marshall, Jr. | ................. | A01C 21/00 43/44.99 |
| 3,047,975 A * | 8/1962 | Pretorius | ................. | A01K 97/045 43/44.2 |
| 3,958,357 A * | 5/1976 | Frank | ................. | A01K 97/045 43/42.06 |
| 4,809,455 A * | 3/1989 | Smart | ................. | A01K 97/02 43/4.5 |
| 4,839,982 A * | 6/1989 | Wood | ................. | A01K 85/01 43/44.4 |
| 4,961,280 A * | 10/1990 | Hudson | ................. | A01K 83/06 43/44.99 |
| 5,216,829 A * | 6/1993 | Morton | ................. | A01K 97/045 43/44.99 |
| 6,003,264 A * | 12/1999 | Hnizdor | ................. | A01K 83/00 43/42.25 |
| 6,122,856 A * | 9/2000 | Hnizdor | ................. | A01K 85/08 43/42.28 |
| 6,247,260 B1 * | 6/2001 | Kandlbinder | ................. | A01K 83/06 43/44.4 |

(Continued)

FOREIGN PATENT DOCUMENTS

WO WO-8606251 A1 * 11/1986

*Primary Examiner* — Christopher P Ellis
(74) *Attorney, Agent, or Firm* — J. Nevin Shaffer, Jr.

(57) ABSTRACT

A multi-mesh and hook apparatus and method with a first mesh enclosure forming a tube with a length and a first end and a second end where the first mesh enclosure includes mesh openings of a first size. A second mesh enclosure forming a tube with a length and a first end and a second end where the second mesh enclosure includes mesh openings of a second size and where the second size is a different size than the first size and where the second mesh enclosure is inside the first mesh enclosure. A hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank and a removably connectable constriction device connected with the second ends of the first mesh enclosure and the second mesh enclosure such that the second ends of both the first mesh enclosure and the second mesh enclosure are closed.

3 Claims, 7 Drawing Sheets

(56) References Cited

U.S. PATENT DOCUMENTS

| | | | | |
|---|---|---|---|---|
| 6,848,210 | B1* | 2/2005 | Altman | A01K 97/02 |
| | | | | 43/44.99 |
| 6,871,442 | B2* | 3/2005 | Wyatt | A01K 83/06 |
| | | | | 43/44.4 |
| 7,448,159 | B2* | 11/2008 | Berge | A01K 85/01 |
| | | | | 43/44.99 |
| 7,490,432 | B2* | 2/2009 | Gillihan | A01K 83/06 |
| | | | | 43/44.4 |
| 10,834,911 | B2* | 11/2020 | Hutchinson | A01K 97/02 |
| 2006/0213110 | A1* | 9/2006 | Nhou | A01K 83/06 |
| | | | | 43/44.8 |
| 2007/0180757 | A1* | 8/2007 | Kalazich | A01K 83/06 |
| | | | | 43/44.4 |

* cited by examiner

MULTI-MESH AND HOOK APPARATUS AND METHOD

FIELD OF THE INVENTION

This invention relates to a multi-mesh and hook device. In particular, in accordance with one embodiment, the invention relates to a multi-mesh and hook apparatus with a first mesh enclosure forming a tube with a length and a first end and a second end where the first mesh enclosure includes mesh openings of a first size. A second mesh enclosure forming a tube with a length and a first end and a second end where the second mesh enclosure includes mesh openings of a second size and where the second size is a different size than the first size and where the second mesh enclosure is inside the first mesh enclosure. A hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank and a removably connectable constriction device connected with the second ends of the first mesh enclosure and the second mesh enclosure such that the second ends of both the first mesh enclosure and the second mesh enclosure are closed.

BACKGROUND OF THE INVENTION

Fishing is not easy. Fishing and the art of fishing, in fact, are age old mysteries. One known factor in increasing the rate of successful fishing is to use fresh bait. Ground bait is better since it produces more scent and thus attracts more fish and combining two or more baits into one increases the attractiveness of the offering even further. Additionally, one of the holy grails of fishing is to create a lure that looks, smells and moves in such a way that mimics natural prey to the fish.

There are, however, many problems with the use of ground bait not the least of which is containing the bait in proximity to the jig or hook and on the lure. It is extraordinarily difficult to combine fresh ground natural bait with a lure and still maintain the integrity of the lure to "mimic" live natural food.

Different baits, for example, once ground, chopped or minced have different properties such as thickness, consistency which makes especially difficult to contain and retain the various baits but at the same time to allow some bait to leak so as to create a scent trail for fish to follow.

Additionally, constructing a container that mimics live natural bait is difficult in the extreme. Further the container must stand up to the rigors of fish attacking it, casting, strong water currents and rough surf conditions while at the same time providing a container that mimics live natural bait.

Further, prior art containers do not address the persistent issue of the lure catching on snags or weeds. Not having a weedless or snag-less feature means the angler has little choice but to fish the lure only in waters clear of weeds or snags or face the high probability of losing or damaging multiple lures. All anglers know that fish seek protective cover from predators or use cover to ambush their prey so having a lure that inhibits the probability of getting caught in weeds or snags allows the angler to fish "where the fish are".

Applicant is aware of prior art devices that use mesh containers that do little or nothing to successfully address the difficulty of attaching a mesh container to a jig or hook, while at the same time providing a means for adding new bait without detaching the container from the hook.

Further, none of the prior art allow options to add additional lure components to the mesh lure which enhance the lure's ability to mimic live bait. Prior art devices generally simply include a single mesh bag with bait inside with no features to attract fish other than odor, no provision for refilling and no protection against damage from repetitive use alone or from snagging on obstacles in the water.

Thus there is a need in the art for an apparatus and method that addresses the aforementioned problems in a manner that is robust and flexible so as to accommodate a full spectrum of jig or hook and mesh container configurations, shapes and dimensions and that provides options to attach additional lure components.

It therefore is an object of this invention to provide an improved jig/hook and mesh attachment apparatus and method that is easy to use and reuse and that is economical to make, that mimics live natural bait, and that is resistant to damage.

SUMMARY OF THE INVENTION

Accordingly, the multi-mesh and hook apparatus and method of the present invention, according to one embodiment, includes a first mesh enclosure forming a tube with a length and a first end and a second end where the first mesh enclosure includes mesh openings of a first size. A second mesh enclosure forming a tube with a length and a first end and a second end where the second mesh enclosure includes mesh openings of a second size and where the second size is a different size than the first size and where the second mesh enclosure is inside the first mesh enclosure. A hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank and a removably connectable constriction device connected with the second ends of the first mesh enclosure and the second mesh enclosure such that the second ends of both the first mesh enclosure and the second mesh enclosure are closed.

All terms used herein are given their common meaning so that "mesh" identifies and describes a material that includes open spaces from one side to the other. "Enclosure" describes a container structure and "Tube" describes a structure that surrounds an open space within or formed by the container, as with a garden hose, for example. "Openings" describes a space between one structure and another as in the openings in a chain link fence. Here the mesh of the invention has openings of a certain size but which, as described more fully hereafter, vary in size from one mesh to another.

"Hook" describes the curved end with a barb of a fishing hook as is known as is the "shank" which extends from the hook and provides a place, an eye, for fishing line to be attached.

"Constriction device" describes a device which produces compressive force when in use such as a rubber band when stretched and wrapped around something, for example only and not by limitation.

According to one aspect, the mesh openings of the second size are smaller than the mesh openings of the first size.

In another aspect, the invention further includes a third mesh enclosure forming a tube with a length and a first end and a second end where the third mesh enclosure includes mesh openings of a third size and where the third mesh enclosure surrounds the first mesh enclosure.

In one aspect, the third size is smaller than the second size and the second size is smaller than the first size.

In one aspect, the hook with a shank includes a jig where the jig partially extends from the first ends of the first mesh enclosure and the second mesh enclosure.

In another aspect, the invention further includes a lure connected within the tube of the second mesh enclosure with the shank of the hook such that the removably connectable constriction device seals the second ends of the first mesh enclosure and the second mesh enclosure and a portion of the lure extends past the second ends.

In one aspect, the invention further includes a lure connector with a first connection end and a second connection end where the first connection end is attached to the lure and where the second connection end is connected with the second ends of the first mesh enclosure and the second mesh enclosure.

In one aspect, the lure is connected with the shank with an elastic band such that the elastic band draws the lure towards the shank.

In one aspect, the first mesh enclosure is connected to the second mesh enclosure at the first ends and the second ends while free to move along the length of the first mesh enclosure.

In another aspect, the hook is parallel to the outside surface of the first mesh such that a portion of the hook contacts the first mesh.

According to another embodiment, a multi-mesh and hook apparatus consists of a first mesh enclosure forming a tube for releasably retaining ground bait with a length and a first end and a second end where the first mesh enclosure includes mesh openings of a first size. A second mesh enclosure forming a tube for releasably retaining ground bait with a length and a first end and a second end where the second mesh enclosure includes mesh openings of a second size where the second size is a different size than the first size and where the second mesh enclosure is inside the first mesh enclosure. A hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank. A removably connectable constriction device connected with the second ends of the first mesh enclosure and the second mesh enclosure such that the second ends of both the first mesh enclosure and the second mesh enclosure are closed. And a lure connected within the tube of the second mesh enclosure with the shank of the hook such that the removably connectable constriction device seals the second ends of the first mesh enclosure and the second mesh enclosure and a portion of the lure extends past the second ends.

In one aspect, the mesh openings of the second size are smaller than the mesh openings of the first size.

In another aspect, the invention further includes a third mesh enclosure forming a tube with a length and a first end and a second end where the third mesh enclosure includes mesh openings of a third size and where the third mesh enclosure surrounds the first mesh enclosure.

In one aspect, the third size is smaller than the second size and the second size is smaller than the first size.

In one aspect, the hook with a shank includes a jig and the jig partially extends from the first ends of the first mesh enclosure and the second mesh enclosure.

In another aspect, the first mesh enclosure and the second mesh enclosure are comprised of clear, see-through, mesh material. Here the terms "clear" and "see through" are given their common meaning to describe a material such as clear plastic or glass, for example, that provides an un-obscured view of objects.

In another aspect, the invention further includes a lure connector with a first connection end and a second connection end where the first connection end is attached to the lure and where the second connection end is connected with the second ends of the first mesh enclosure and the second mesh enclosure.

In one aspect, the lure is connected with the shank with an elastic band such that the elastic band draws the lure towards the shank.

According to another embodiment, a multi-mesh and hook method consists of:

a. providing a first mesh enclosure forming a tube for releasably retaining ground bait with a length and a first end and a second end where the first mesh enclosure includes mesh openings of a first size; a second mesh enclosure forming a tube for releasably retaining ground bait with a length and a first end and a second end where the second mesh enclosure includes mesh openings of a second size where the second size is a different size than the first size and where the second mesh enclosure is inside the first mesh enclosure; a hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank; a removably connectable constriction device connected with the second ends of the first mesh enclosure and the second mesh enclosure such that the second ends of both the first mesh enclosure and the second mesh enclosure are closed and a lure connected within the tube of the second mesh enclosure with the shank of the hook such that the removably connectable constriction device seals the second ends of the first mesh enclosure and the second mesh enclosure and a portion of the lure extends past the second ends: and b. inserting ground bait into the tube of the second mesh enclosure.

In one aspect, the method further includes a third mesh enclosure forming a tube with a length and a first end and a second end where the third mesh enclosure includes mesh openings of a third size and where the third mesh enclosure surrounds the first mesh enclosure and where the third size is smaller than the second size and the second size is smaller than the first size.

In one aspect, the hook with a shank includes a jig where the jig partially extends from the first ends of the first mesh enclosure and the second mesh enclosure.

In another aspect, the lure is connected with the shank with an elastic band such that the elastic band draws the lure towards the shank such that ground bait is constantly pressed out of the mesh enclosures.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE INVENTION

Figure 1:
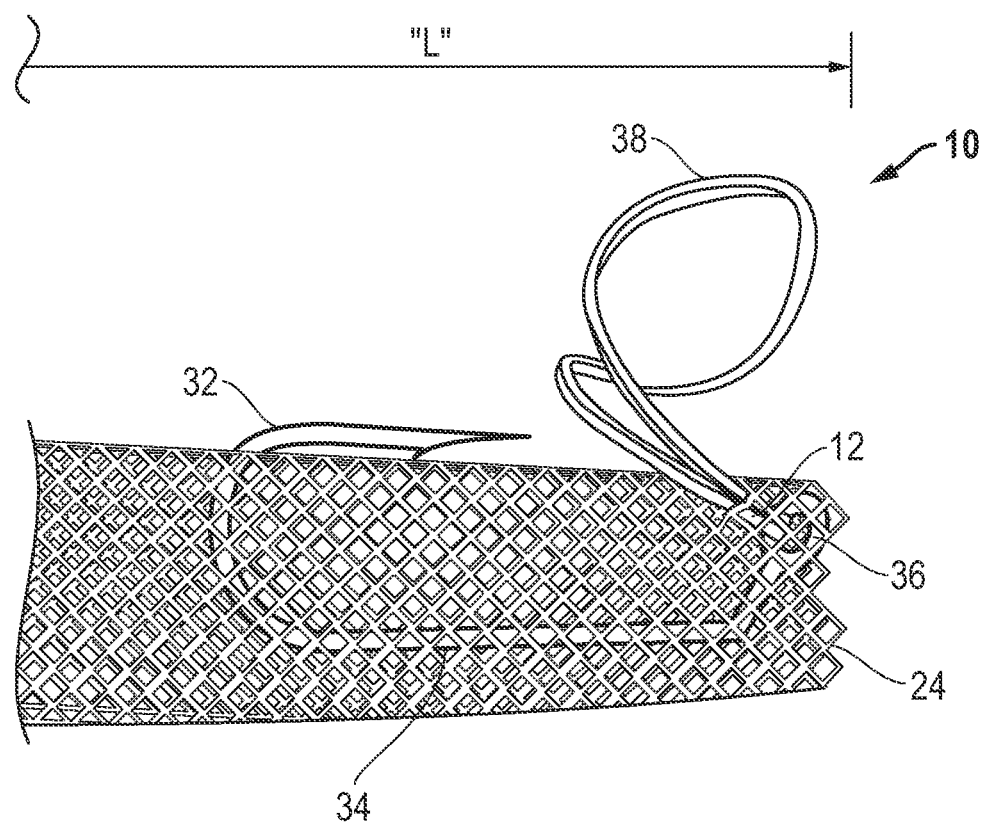
FIG. 1 is a side view of the multi-mesh and hook apparatus of the present invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

A preferred embodiment of the present invention is illustrated by way of example in FIGS. 1-7. With specific reference to FIGS. 1 and 2, a multi-mesh and hook apparatus and method 10 has a first mesh enclosure 12 forming a tube 14 with a length "L" and a first end 16 and a second end 18 where the first mesh enclosure 12 includes mesh openings 20 of a first size 22.

Figure 2:
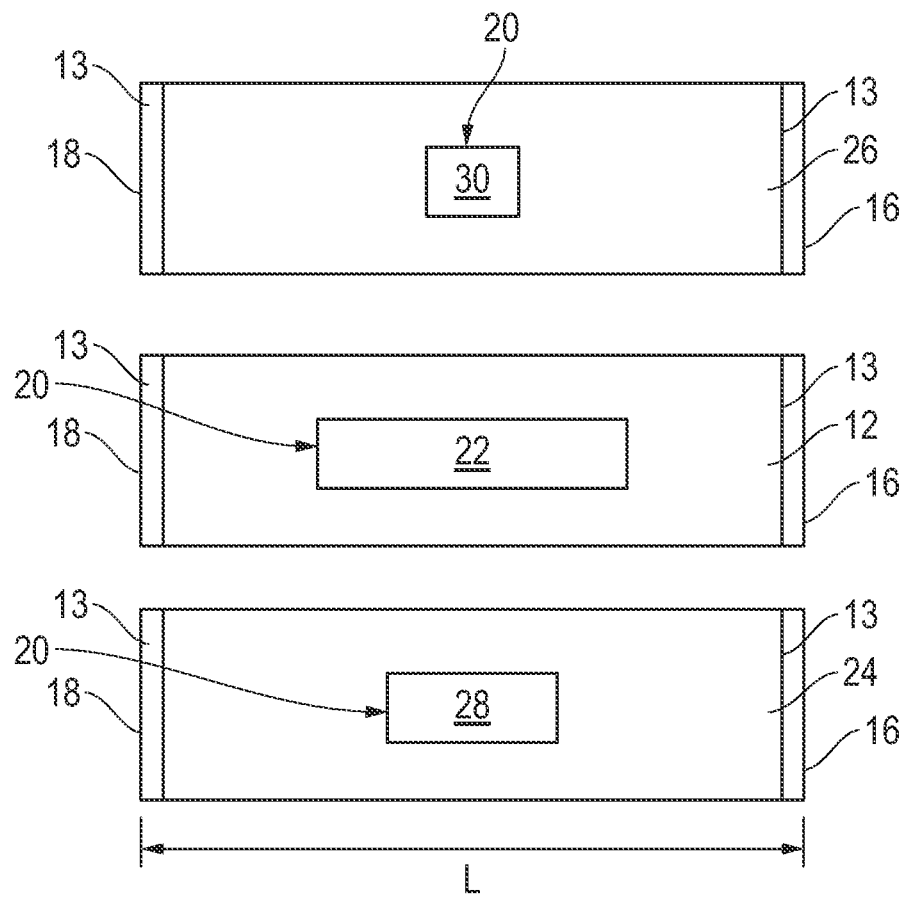
FIG. 2 is a schematic view of three layers of mesh with different mesh sizes.

Referring now to FIG. 2, this schematic illustrates the preferred sizes of mesh openings 20 formed in second mesh enclosure 24 and when present, third mesh enclosure 26. Preferably, first mesh enclosure 12 has mesh openings 20 of a first size 22, second mesh enclosure 24 has mesh openings 20 of a second size 28 and third mesh enclosure 26 has mesh openings 20 of a third size 30. In a preferred embodiment, the mesh enclosures are located one within another as with the second mesh enclosure 24 inside of the first mesh enclosure 12. Further, in this form, preferably, the mesh openings 20 are arranged such that the second size 28 of mesh openings 20 in second mesh enclosure 24 are smaller than the first size 20 of the first mesh enclosure 12.

Still referring to FIG. 2, preferably, the first mesh enclosure 12 is connected by adhesive 13 to the second mesh enclosure 24, and the third mesh enclosure 26 when present, at the first ends 16 and the second ends 18 while still being free to move along their length "L". This prevents the separate mesh enclosures from bunching up when bait is added for example. Adhesive 13 may by glue or the ends may be heated to melt together or any other joining product or device now known or suitable for the purposes of the invention.

Also, preferably, as illustrated in the schematic of FIG. 2, when present, third mesh enclosure 26 surrounds both first enclosure 12 and second enclosure 24. And, in this form, the mesh openings 20 are arranged such that the second size 28 of mesh openings 20 in second mesh enclosure 24 are smaller than the first size 22 of the first mesh enclosure 12 while the third size 30 of the mesh openings 20 of third mesh enclosure 26 are smaller than the second size 28 of second mesh enclosure 24. Thus, the size of the openings from the outside to the inner mesh enclosure goes: smallest, small, smaller. That is, preferably, third size 30 is smaller than second size 28 which is smaller than first size 22. As will be described more fully hereafter, Applicant has found that in this arrangement bait is added to the second mesh enclosure 24 and released through mesh openings 20 to the first mesh enclosure 12 which provides further controlled release of the bait and provides strength to the structure. When present, third mesh enclosure 26 provides maximum bait release control with the smallest third size 30 mesh openings 20, for example only and not by limitation.

Continuing with the description, second mesh enclosure 24 forms a tube with a length "L" and a first end 16 and a second end 18 just as first mesh enclosure 12. Again, preferably, the second mesh enclosure 24 includes mesh openings 20 of a second size 28 where the second size 28 is a different size than the first size 22 and where the second mesh enclosure 24 is inside the first mesh enclosure 12.

Strength is an important element of the structure of all of the mesh enclosures of the present invention. Additionally, the type of material the mesh enclosures are made of is important. Applicant has found that mesh that is very "sheer" and "see through" is vital because it is important that the fish sees as much bait and as little mesh as possible.

Preferably, the inner mesh openings are small and intended to keep the bait inside and a much stronger outer mesh enclosure is provided that resists tearing. Using a very sheer inner mesh minimizes the ability of the fish to see the mesh itself and maximizes the view of the bait. Applicant's multiple mesh approach also adds the ability of trapping/retaining bait in-between the layers of mesh thus resisting excessive loss of bait extruding out when a fish bites. Without Applicant's multi-mesh enclosures, anglers will continue to do what they have always heretofore have done which is to recharge and refill the lure after every bite.

A hook 32 with a shank 34 is provided, where the hook 32 is removably connected with the first ends 16 of both the first mesh enclosure 12 and the second mesh enclosure 24 (as well as the third mesh enclosure 26 when present) and extends outside of the first mesh enclosure 12 and the second mesh enclosure 24 as shown in the Figures. As is often the case, shank 34 includes an eye 36 used to attach fishing line, for example.

Figure 3:
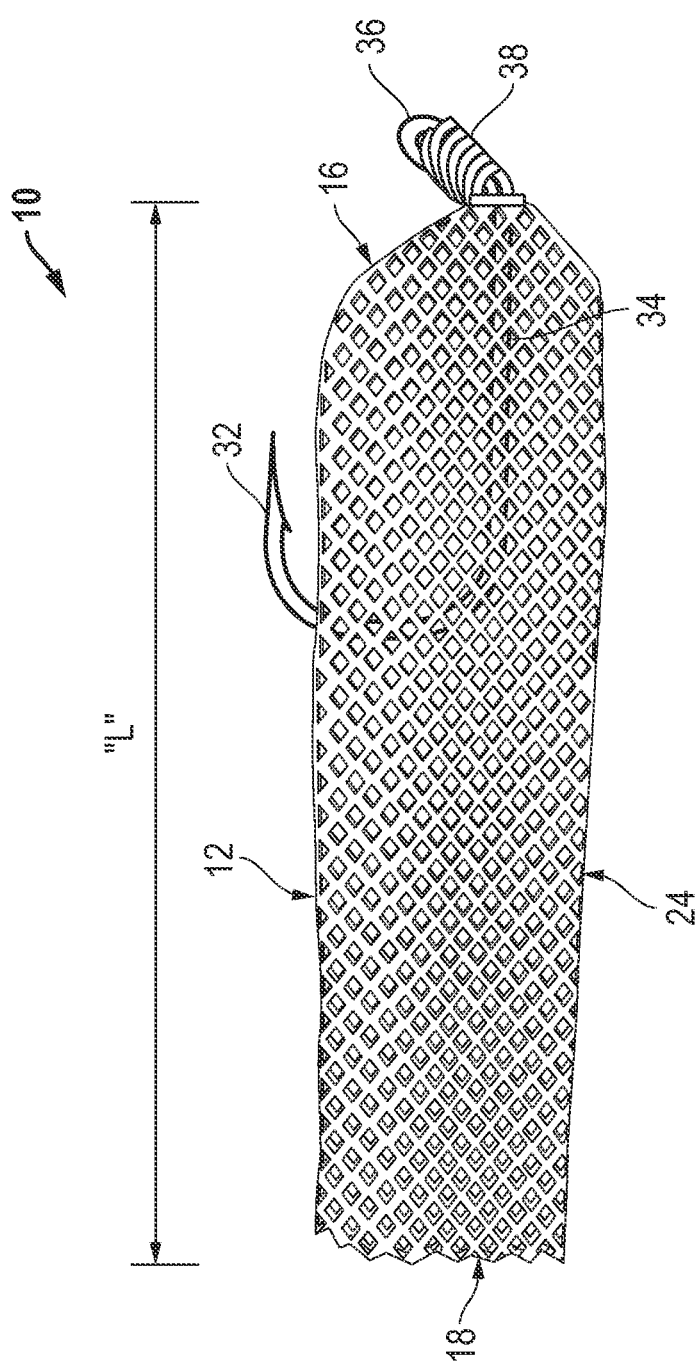
FIG. 3 is a side view of the invention of FIG. 1 with the first ends of the mesh enclosures secured to the shank.

Shank 34 is secured at the first ends 16 such that the first ends 16 are sealed against the shank 34. FIG. 1 shows that preferably a connectable constriction device 38, such as a rubber band, for example only and not by limitation, provides the secure connection at the first ends 16 as shown in FIGS. 2 and 3.

Figure 4:
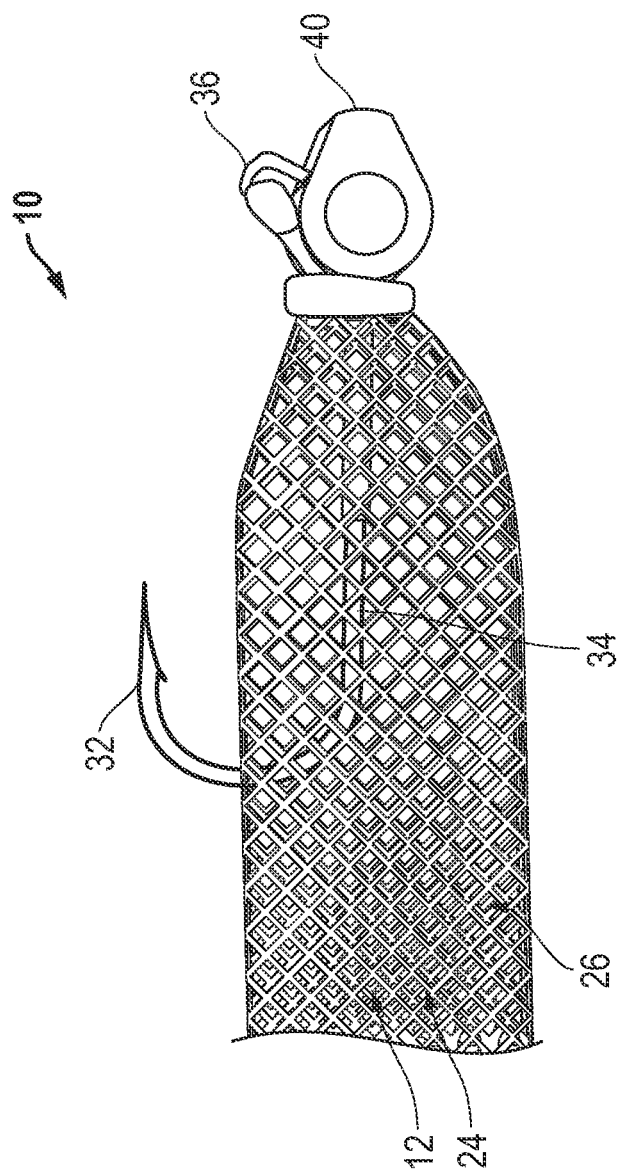
FIG. 4 is a side view of the invention of FIG. 1 showing a jig extending from the first ends of the mesh enclosures.

FIG. 4 shows where the hook 32 with a shank 34 includes a jig 40. Jigs 40 typically include a weighted body made of lead, for example only, as well as a hook 32 and shank 34. When present, preferably, when secured in place at the first ends 16, the jig 40 partially extends from the first ends 16 of the first mesh enclosure 12 and the second mesh enclosure 24 (and the third mesh enclosure 26 when present).

Figure 5:
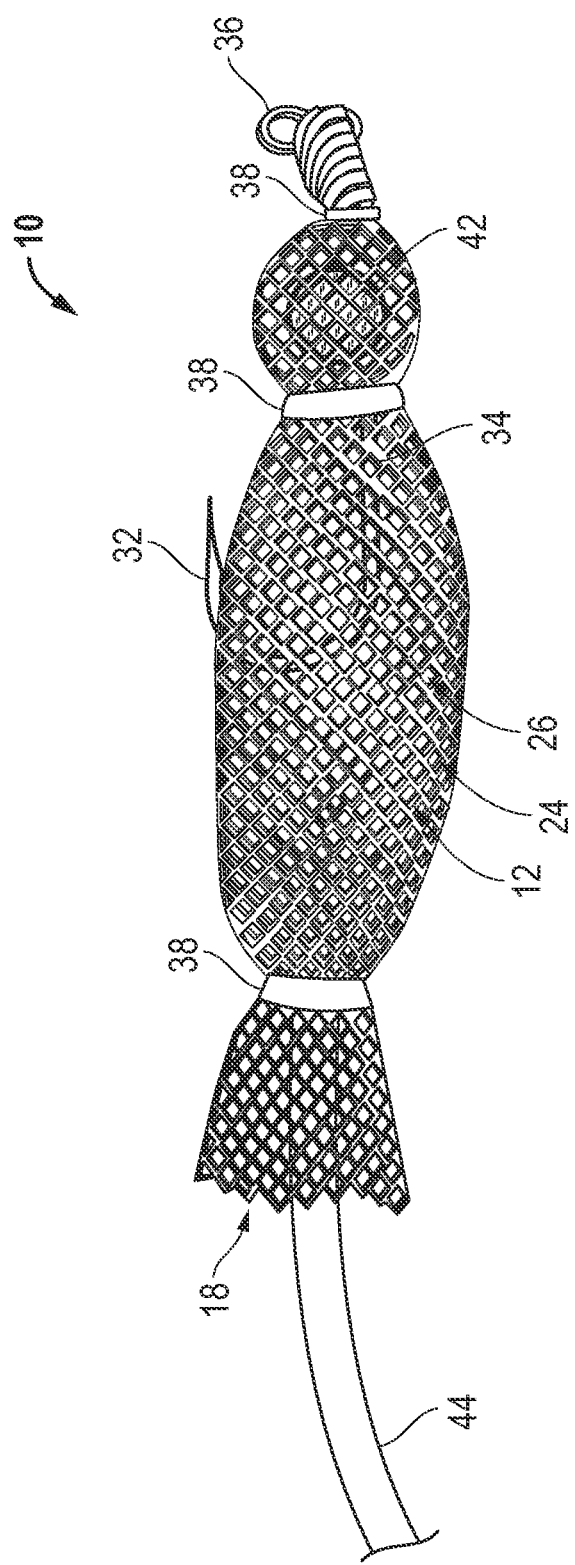
FIG. 5 is a side view of the invention of FIG. 1 illustrating a fish hook compressed near the mesh enclosure and an artificial eye added in the mesh enclosure.

Referring to FIG. 5, removably connectable constriction device 38 is connected with the second ends 18 of the first mesh enclosure 12 and the second mesh enclosure 24 (and the third mesh enclosure 26 when present) such that the second ends 18 of both the first mesh enclosure 12 and the second mesh enclosure 24 (and the third mesh enclosure 26 when present) are closed. By "closed" it is meant to mean that the second ends 18 are compressed together such that bait, when present, does not escape from the second ends 18 but must only pass through mesh openings 20.

FIG. 5 also illustrates other features of the apparatus where an artificial eye 42 is added at the first ends 16 simply by securing the first ends 16 to the shank 34 as described above and then using another connectable constriction device 38 to secure the eye 42 in place.

Also, Applicant has determined that a significant reduction in snagging of hook 32 is provided by ensuring the hook 32 is held in place by its connection through the mesh enclosures and by connectable constriction device 38 holding it against movement once attached. Further, Applicant has found reduced snagging by bending hook 32 parallel to the outside surface with some small portion of the hook contacting the exterior mesh enclosure 12 or 26 as shown.

Many lures have weedless features but Applicant knows of no "mesh" lure that has this "weedless" feature. The simplicity of how the weedless feature works in this mesh lure versus other lures is striking. In the multi-mesh lure of the present invention, the hook is pushed down toward the outside of the bait filled apparatus until the point of the hook is even and parallel to, and preferably partially touching, the outside surface of the first multi-mesh enclosure. The surprising result is that Applicant's invention effectively becomes weedless and the hook becomes virtually invisible. When a fish bites, the pressure of the bite moves the multi-mesh enclosure away from the point of the hook. This exposes the hook such that the hook functions as designed to hook the fish.

Applicant has determined that structuring the apparatus so as to "hide" the hook is an important feature and highly desirable but so difficult to accomplish that the prior art industry does not even address it. Simply stated, the problem is: How is it possible to hide a hook in a lure device without adversely affecting its ability to function and hook the fish? In contrast to Applicant's multi-mesh and hook lure, other lures that desire a weedless function add a wire guard. The draw backs to this being that you must add a device to the hook (added expense) and the hook must be fully exposed for the wire guard to function properly. That is, the prior art weedless wire guard by design can and often does impede the ability to hook the fish. The adjustable multi-mesh and hook apparatus with the hook positioned as described solves both challenges.

Figure 6:
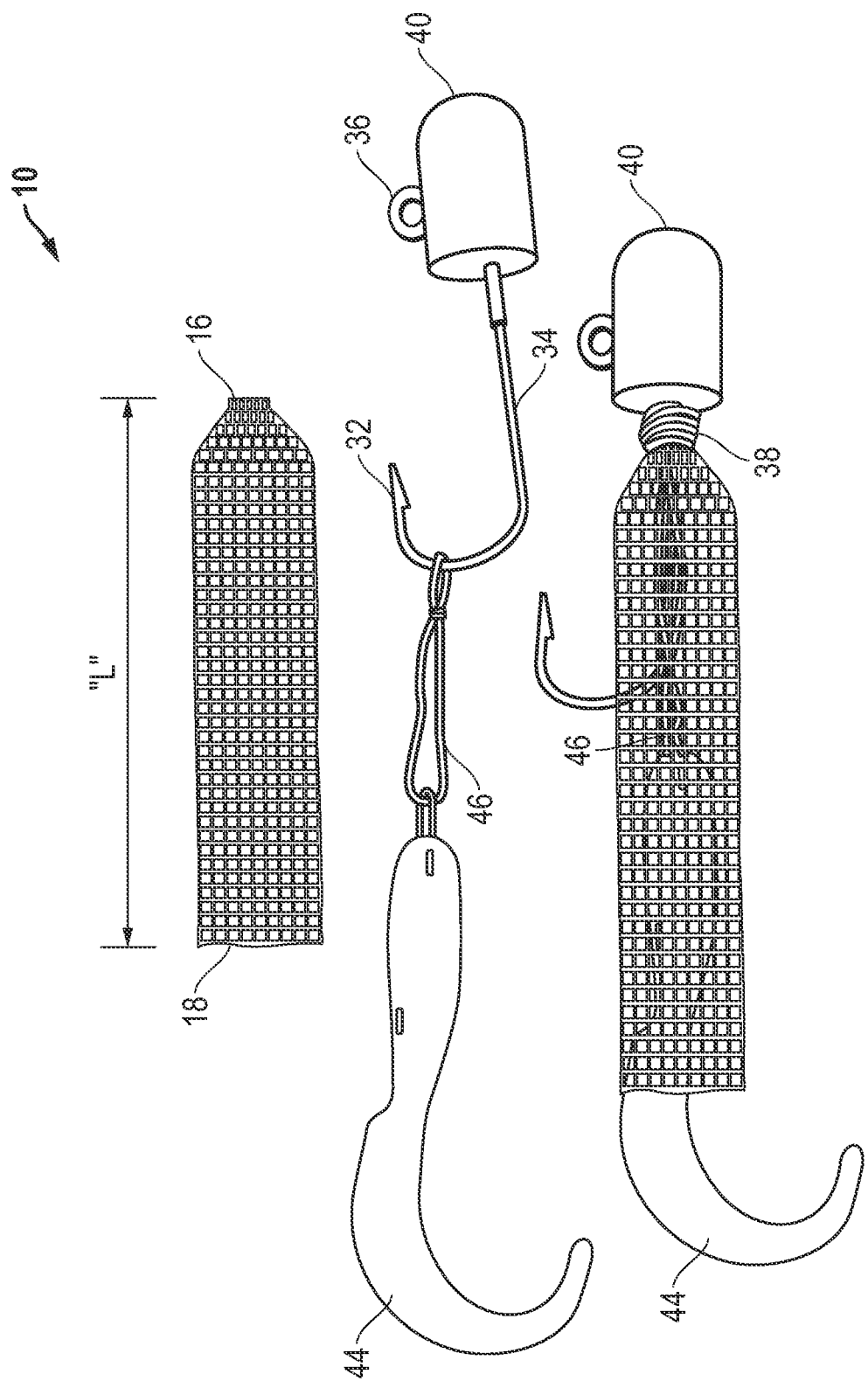
FIG. 6 is a side view of two ways a lure is attached to the hook shank.

Referring now to FIGS. 5 and 6, in a preferred embodiment, the apparatus further includes a lure 44. "Lure" describes a structure in a shape deemed attractive to fish, such as a worm shape, for example only. Lure 44 is connected within the tube of the second mesh enclosure 24 with the shank 34 of the hook 32 such that the removably connectable constriction device 38 seals the second ends 18 of the first mesh enclosure 12 and the second mesh enclosure 24 (and third mesh enclosure 26 when present) and a portion of the lure 44 extends past the second ends 18 as shown in FIG. 5.

FIG. 6 shows the lure 44 connected with the shank 34 with an elastic band 46 such that the elastic band 46 constantly draws the lure 44 towards the shank 34 such that ground bait when present is constantly pressed out of the mesh enclosures 20. Elastic band 46 may be the same material as connectable constriction device 38 such as a rubber band, for example only. Lure 44 may be connected at the bend of the shank 34 where hook 32 begins to form or at the top of the shank 34 for example only and not by limitation.

This feature of the present invention allows for quick and simple loading and reloading of the bait. Also, importantly, this structure, resulting in the pulling pressure exerted against the bait by the elastic band attached to the plastic lure, keeps the bait snug next to the outer layer of mesh enclosures which is highly desirable improvement over the prior art.

Figure 7:
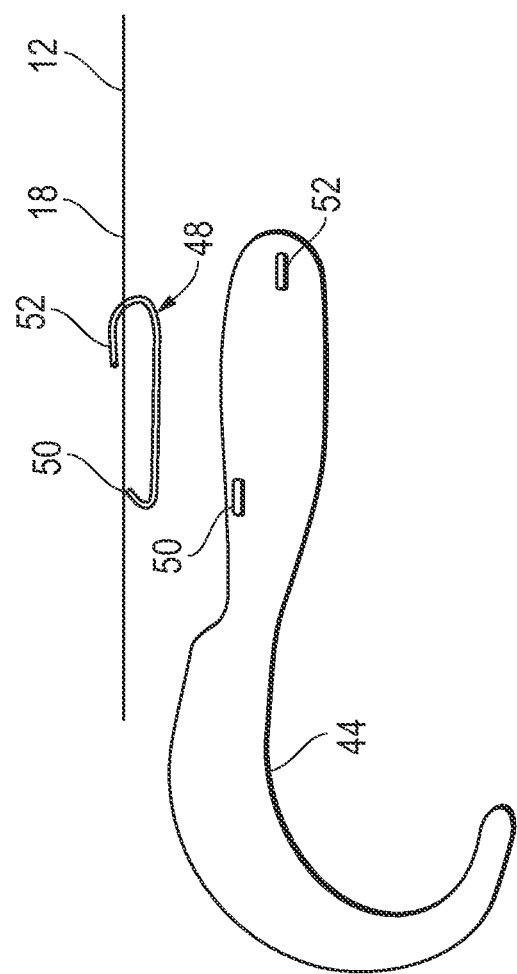
FIG. 7 is a top view of the lure connector outside of and connected with the lure.

Referring to FIG. 7, connecting the lure 44 with the mesh enclosure(s) 12, 24 and 26, in addition to use of removably connectable constriction device 38 is enhanced with the use of a lure connector 48 with a first connection end 50 and a second connection end 52. First connection end 50 is attached to the lure 44 and second connection end 52 is connected with the second ends 18 of the first mesh enclosure 12 and the second mesh enclosure 24 (and third mesh enclosure 26 when present)

By way of further explanation and description, anglers are constantly searching for ways to enhance the effectiveness of lures to attract and catch fish. Using scents that mimic food that fish eat is one that most pursued areas of the art of lure making as is making the lure mimic the appearance of natural bait. The search for a lure that looks, moves and smells like natural food is the "Holy Grail" of the art of lure making.

The main building materials for most lures that mimic live bait are made of plastic, metal, wood and other similar materials. These materials make it difficult to keep scent on the lure to attract fish. Virtually all lure scents are either artificial or natural fish oils. These scent products are sprayed on the lure, the lure is impregnated with the scent or soaked in the scent. Anglers are confounded by the fact that when scents are sprayed on or the lure is soaked in the scent the scent washes off after a few casts into the water. Lures impregnated with scent maintain the scent longer but these lures are mainly bits of material that look nothing like a natural live bait which decreases its effectiveness to attract fish. All these scents are relatively expensive to purchase.

Lures designed to use natural baits as part of the lures are effective in attracting and catching fish. However, these lures are limited in application because they are restricted in the variety of baits that can effectively be impaled on the hook.

For instance, a lead head jig can catch fish as a stand-alone lure, but if the angler puts a piece of natural bait on the jig hook that enhances the lure and the angler has more opportunity to catch fish. The angler may instead place a soft plastic lure on the jig hook and that also enhances the lures ability to attract fish. But the angler will run into great difficulty if both the natural bait and the plastic lure are used at the same time.

Anglers know that when natural baits are cut, crushed, chopped, or minced ("processed bait") that the natural odor is enhanced considerably as a fish attractant. Anglers also know that once processed as mentioned the bait is very difficult if not impossible to put and keep on a hook. Many times, the anglers lose the bait in the act of casting the soft bait out into the water. The act of casting slings the bait off the hook. If the bait is not lost in the act of casting it often dislodges upon impact with the water or comes off the hook on its way to the bottom, torn off the hook by the resistance of the water.

Another problem the angler must contend with is many times smaller fish not targeted by the angler find the soft bait first and take the bait off the hook before the targeted fish ever have a chance to find and take the bait. Because the bait is soft and delicate these small fish take the bait many times without the angler realizing the bait is gone. Thus, the fact is that with these processed baits the angler rarely gets a second chance to hook their quarry. Either the fish steals the bait on the first bite or when the angler's attempts to set the hook in the fish's mouth but misses, he jerks the bait off the hook.

Further, anglers are confounded by the need to fish in or near underwater cover such as rocks, logs, brush and weeds because anglers know fish stay close to cover for protection and use the cover to hide "ambush" their prey but the issue is the lure constantly gets caught in this cover and the angler damages the lure or loses the lure in trying to dislodge it form the obstacles. Anglers have realized that placing the soft bait in a container increases their chance of catching a fish as well as decreases the amount of bait lost to the aforementioned causes. To this end many containers have been developed of various materials but they are not without their drawbacks. The main issue being they do not mimic the appearance of a live natural bait. For the most part these containers are just a container of material with bait inside that has no resemblance of live bait.

Additionally, these containers being made of only one type of material are suited to effectively hold a very limited number of different types of soft baits. Further, many of the container devices make loading the bait into the container difficult and awkward so that an inordinate amount of time is expended filling the container as opposed to fishing.

Anglers know that by combining various baits and forming a "Cocktail" bait that combinations of baits often are more enticing to the fish and result in more bites and therefore, more opportunities to catch fish. This art of combining different baits is not without its challenges and often has many limitations especially if trying to combine these baits with another lure and mimic live bait. Trying to combine these and other forms of natural bait into combination baits in a form that will remain on the hook can be difficult and result in numerous limitations on what baits can be successfully combined and further limitations on catching larger fish because often these combination baits offerings are small because only so much bait will fit on a hook.

Anglers often must go to trouble of tying the baits together with strings or rubber bands with various degrees of success. As mentioned, before, these baits can be put into a container but again the finished presentation looks nothing like live natural bait.

Anglers also know there are many issues associated with the use of a mesh fabric to hold bait. One problem concern is getting the mesh off the hook which more often than not tears open the mesh container thus limiting its use. Otherwise, to prevent tearing, the mesh fabric may be so strong that the hook must be cut out of the fabric thus once again destroying the bait container.

Further, virtually all mesh containers are made of one type mesh only which may or may not meet the needs that angler's desires. For example, a common mesh material available to encase salmon eggs works in fresh water rivers where there is limited competition for the bait. This mesh is very fine and just strong enough to contain the bait. This mesh, however, would not last even seconds in sea fishing because of the super abundance of bait stealing fish.

The size of the mesh opening is another limiting factor. Typically, mesh containers of the current art have only one mesh opening size which directly affects the ability to hold the bait and release material as odor. In summary, because of all the challenges involved in creating and employing combinations baits and the expense of buying them, not many anglers pursue this art and miss out on a highly effective means of catching fish.

Accordingly, the Applicant developed the present invention for use with a Jig with hook or hook which has resulted in a highly effective lure that combines artificial lures (plastic baits and Reflective Strips/Skirts) with a multi-mesh container constructed of multiple layers of different type of meshes which holds the natural bait. A distinguishing element of the structure of the present invention is that the middle of the lure is made of a fabric mesh container (second mesh enclosure 24) designed to hold the natural bait. In one aspect, an outer mesh container (first mesh enclosure 12) surrounds one, or two or more interiorly located mesh containers. Applicant has found that multiple layers of different mesh material takes advantage of the qualities in each material such as: strength, suppleness and size and shape of the mesh openings. Changing any combination creates a "different mesh container" that is suited for different baits and fishing conditions.

Applicant has found the basic assembly of an inner mesh enclosure 24 for holding the bait surrounded by and outer mesh enclosure 12 for strength and secondary bait retention is a unique solution to a long standing unsolved problem. Further, adding a third outer layer, mesh enclosure 26 with the smallest mesh opening size, enables even greater functionality for retaining bait while the middle mesh has large mesh openings and adds strength to the structure.

In one aspect, the apparatus uses a jig head or hook which is attached to the mesh at one end of the lure and the plastic or reflective strips or skirts lure is attached to either end of the mesh container. Again, according to the inventive concept, the mesh container makes up the middle portion of the device while the jig with a hook or lone hook with or without added lure eyes, with or without reflective strips make up the front of the lure and the plastic lure, reflective strips/skirts make up the rear of the invention.

The present invention provides the user with the right combination of mesh materials and brings the three components together in a manner such that the lure looks like natural bait in the water. Further, the present invention allows the angler to use any bait. The angler simply processes the bait in a form that can be hand loaded as with chuck bait or injected into the mesh container by means of any syringe type injection device as with bait processed into a soft pliable form. The cutting, mincing releases all the natural scents of the bait thus enhances the fish attracting essence of the bait. The multiple layer mesh enclosure of the present invention holds these forms of bait thus solving the problem of keeping soft baits on the hook in the most effective and efficient manner.

By processing the bait, the angler can now explore the world of "Combination Baits", baits consisting of two or more baits combined to enhance further the attracting qualities of each bait used. The baits are simply combined after each is processed. This also allows the angler to control and "tweak" the ingredients of their baits to match ever changing fishing conditions. The different mesh combination allows the angler to select any combination to meet the needs, they desire for the bait used. As can now be understood, the present invention is very different from the current art of tying whole pieces of bait together on a hook with line, string to form a combination bait.

The invention includes at least one attaching device, connectable constriction device 38, which easily affixes and releases the multi-mesh container to the jig or hook. This is essential in making the apparatus easy to construct on the spot. This connectable constriction device 38, such as an elastic band, sets the invention apart from other lure concepts in that the elastic band not only connects the jig or hook to the mesh enclosures but also provides the elastic tension required to place and keep the invention in the "weedless/snag-less posture with the hook upright and parallel to the outer surface of the mesh enclosure, and held in position when that option is employed.

As can be understood, the mesh is essentially formed into a shape that mimics that of a bait fish. In one embodiment the front end of the mesh container is designed to slip on the backside of the jig and be and affixed with an elastic band. Another embodiment allows the mesh container to slip over the hook only and then is affixed with the elastic band. This also closes and seals the bait within the mesh container and prevents the bait from escaping from the front end.

Constructions of the rear end of the device, according to one embodiment, uses an elastic band to wrap around and constrict the second end of the mesh container. This seals the bait in the container, and forms the bait portal where bait in introduced into the center mesh enclosure and creates the "tail" of the device.

In another embodiment, the second end of the mesh enclosure is sealed by introducing a soft plastic lure that extends past the second ends 18 of the mesh enclosures and also forms the tail of the mesh-lure, the difference being in this embodiment the tail moves like that of a swimming bait fish. The soft plastic lures used in this application are readily available to anglers and come in a variety of shapes and colors which gives the angler the added flexibility to use a wide variety of plastic lures and by being very easily to attach detach (simply wrap or un-wrap the elastic band) makes it very convenient to employ and change at will.

By way of continued explanation and description, the ability of an angler to process whatever bait they want to use as part of this lure is unique. Using a single bait or mixing various bait together gives the angler a versatility not seen with the current art when considering the bait is part of an artificial lure that mimics live bait. The use of a simple elastic band to connect all parts of the present multi-mesh and hook lure makes attaching and detaching all configuration of the lure device simple and quick.

The method of hand loading or injecting bait through a portal in the rear, second ends 18, of the mesh enclosures makes the process simple. This is also unique with mesh lure concepts. The angler does not need to remove the hook from the mesh container to load or reload bait into the present invention. In this concept, the lure is built by first connecting the hook or jig inside the multi-mesh container. All that is left to do is put the bait inside the mesh enclosure at the second end 18 and seal the bait in. The hook or jig remains inside the mesh lure at all times until the lure is de-constructed by the angler.

The angler simply injects or hand packs the bait in the lure at the second end when the need arises. The bait portal at the second end 18 makes inserting an injector nozzle, for example only, to add fresh bait, easy and simple. The injector nozzle is simply pushed past the constricted point at the second end 18 and the bait is injected. When the injector tube is removed the elastic band, connectable constriction device 38, constricts and closes the ends 18 trapping the bait in the mesh container.

The use of a soft plastic lure to secure the bait inside the mesh container is quite novel in that this approach not only secures the bait inside but also makes it possible to use a plastic lure as the plug. The use of an elastic band to keep the plug-in place makes the process very simple and inexpensive and overcomes the problem of using the hook to secure the plastic lure to the Jig head which more often than not damages or destroys the mesh when attempting to remove the hook.

Further, in one aspect, the soft plastic lure is connected with the shank by and elastic band which continuously draws the lure toward the shank so that as bait is lost, the lure adds constant pressure on the bait so as to force the bait past the mesh enclosures.

By now, the advantages of the present invention should be apparent to those of ordinary skill in the art. The ability of an angler to use soft fishing baits which are in abundance and highly prized by anglers but impractical to use because of the difficulty of keeping the bait on the hook is solved. Just as important, this innovation simplifies putting and holding the bait in the mesh and makes it very convenient and easy to use. The present invention enables an angler to access a huge variety of artificial lures to be used with the mesh. The ability to attach a multitude of lures of various shapes, sizes, colors to the mesh gives the angler the ability to change their bait presentations to the fish at will. This is a distinct advantage as it is applied to this invention.

The ability to simple unplug and plug the rear opening of the mesh container to inject bait simplifies the process which otherwise is difficult and or impractical. The use movable elastic band and connectable constrictive devices to connect all parts of the invention allows easy attachment and easy detachment of the parts. This feature allows the angler to quickly construct de-construct the apparatus, then just as quickly charge or re-charge it with bait.

The overall concepts featured in this invention, "Simplicity", "Convenience", and "Practicality", which have been achieved, at the same time allows the angler to use a lure apparatus that looks like, smells like and moves like natural food. This concept takes full advantage of the olfactory, visual, sensory systems of the predatory fish by presenting the "real thing".

In summary, the multi-mesh structure of the present invention completely solves the challenges presented in this field of art with the inner layer(s) of mesh designed to hold and allow some bait to protrude through the mesh opening while the outer layer(s) serve to add strength from ripping/tearing due to fish striking while also controlling release of the bait..

The description of the present embodiments of the invention has been for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A multi-mesh and hook method consisting of:
   a. providing a first mesh enclosure forming a tube for releasably retaining ground bait with a length and a first end and a second end wherein the first mesh enclosure includes mesh openings of a first size; a second mesh enclosure forming a tube for releasably retaining ground bait with a length and a first end and a second end wherein the second mesh enclosure includes mesh openings of a second size wherein the second size is a different size than the first size and wherein the second mesh enclosure is inside the first mesh enclosure; a hook with a shank, where the hook is removably connected with the first ends of both the first mesh enclosure and the second mesh enclosure and extends outside of the first mesh enclosure and the second mesh enclosure and the shank is secured at the first ends such that the first ends are sealed against the shank; a removably connectable constriction device connected with the second ends of the first mesh enclosure and the second mesh enclosure such that the second ends of both the first mesh enclosure and the second mesh enclosure are closed; and lure connected within the tube of the second mesh enclosure with the shank of the hook such that the removably connectable constriction device seals the second ends of the first mesh enclosure and the second mesh enclosure, and a portion of the lure extends past the second ends wherein the lure is connected with the shank with an elastic band such that the elastic band draws the lure towards the shank such that ground bait is constantly pressed out of the mesh enclosures: and
   b. inserting ground bait into the tube of the second mesh enclosure.

2. A multi-mesh and hook method consisting of:
   a. providing a first mesh enclosure forming a tube for releasably retaining ground bait with a length and a first end and a second end wherein the first mesh enclosure includes mesh openings of a first size; a second mesh enclosure forming a tube for releasably retaining ground bait with a length and a first end and a second end wherein the second mesh enclosure includes mesh openings of a second size wherein the second size is a different size than the first size and wherein the second mesh enclosure is inside the first mesh enclosure; a third mesh enclosure forming a tube with a length and a first end and a second end wherein the third mesh enclosure includes mesh openings of a third size and wherein the third mesh enclosure surrounds the first mesh enclosure, and wherein the third size is smaller than the second size and the second size is smaller than the first size; a hook with a shank, where the hook is removably connected with the first ends of both the first mesh enclosure and the second mesh enclosure and extends outside of the first mesh enclosure and the second mesh enclosure and the third mesh enclosure and the shank is secured at the first ends such that the first ends are sealed against the shank; a removably connectable constriction device connected with the second ends of the first mesh enclosure and the second mesh enclosure and the third mesh enclosure such that the second ends of the first mesh enclosure and the second mesh enclosure and the third mesh enclosure are closed and a lure connected within the tube of the second mesh enclosure with the shank of the hook such that the removably connectable constriction device seals the second ends of the first mesh enclosure, the second mesh enclosure and the third mesh enclosure, and a portion of the lure extends past the second ends wherein the lure is connected with the shank with an elastic band such that the elastic band draws the lure towards the shank such that ground bait is constantly pressed out of the mesh enclosures, and
   b. inserting ground bait into the tube of the second mesh enclosure.

3. A multi-mesh and hook method consisting of:
   a. providing a first mesh enclosure forming a tube for releasably retaining ground bait with a length and a first end and a second end wherein the first mesh enclosure includes mesh openings of a first size; a second mesh enclosure forming a tube for releasably retaining ground bait with a length and a first end and a second end wherein the second mesh enclosure includes mesh openings of a second size wherein the second size is a different size than the first size and wherein the second mesh enclosure is inside the first mesh enclosure; a hook with a shank wherein the hook with a shank includes a jig, wherein the jig partially extends from the first ends of the first mesh enclosure and the second mesh enclosure, where the hook is removably connected with the first ends of both the first mesh enclosure and the second mesh enclosure and extends outside of the first mesh enclosure and the second mesh enclosure and the shank is secured at the first ends such that the first ends are sealed against the shank; a removably connectable constriction device connected with the second ends of the first mesh enclosure and the second mesh enclosure such that the second ends of both the first mesh enclosure and the second mesh enclosure are closed and a lure connected within the tube of the second mesh enclosure with the shank of the hook such that the removably connectable constriction device seals the second ends of the first mesh enclosure and the second mesh enclosure, and a portion of the lure extends past the second ends wherein the lure is connected with the shank with an elastic band such that the elastic band draws the lure towards the shank such that ground bait is constantly pressed out of the mesh enclosures: and
   b. inserting ground bait into the tube of the second mesh enclosure.

* * * * *